(12) United States Patent
Koga et al.

(10) Patent No.: US 6,940,218 B2
(45) Date of Patent: Sep. 6, 2005

(54) DOPED FIELD-EMITTER

(75) Inventors: Keisuke Koga, Soraku-gun (JP); Toru Kawase, Katano (JP); Kenichi Honda, Saijyo (JP); Tetsuya Norikane, Ochi-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 138 days.

(21) Appl. No.: 10/637,404

(22) Filed: Aug. 8, 2003

(65) Prior Publication Data

US 2004/0032194 A1 Feb. 19, 2004

(30) Foreign Application Priority Data

Aug. 9, 2002 (JP) .................................... 2002-233785

(51) Int. Cl.[7] .................................................. H01J 1/62
(52) U.S. Cl. ........................ 313/495; 313/309; 313/336; 313/351
(58) Field of Search .................. 313/309, 336, 313/351, 495

(56) References Cited

U.S. PATENT DOCUMENTS 6,400,074 B1    6/2002  Yamaura et al.
6,495,965 B1   12/2002  Yamaura et al.
6,630,772 B1 * 10/2003  Bower et al. ............... 313/311

FOREIGN PATENT DOCUMENTS

| JP | 48-90467 | 11/1973 |
| JP | 7-192604 | 7/1995 |
| JP | 8-255555 | 10/1996 |
| JP | 11-273594 | 10/1999 |
| JP | 2000-30639 | 1/2000 |
| JP | 2000-36242 | 2/2000 |

* cited by examiner

*Primary Examiner*—Vip Patel
(74) *Attorney, Agent, or Firm*—Hamre Schuman Mueller & Larson, P.C.

(57) ABSTRACT

A field-emission electron source element includes a cathode substrate, an insulating layer that is formed on the cathode substrate and has an opening, a lead electrode formed on the insulating layer, and an emitter formed in the opening. A surface layer of an electron emitting region of the emitter is doped with at least one reducing element selected from the group consisting of hydrogen and carbon monoxide. Further, an image display apparatus including the above-mentioned field-emission electron source element is provided. This makes it possible to obtain not only a stable field-emission electron source element that does not cause a current drop even after a high current density operation for a long time but also a high-performance image display apparatus that can maintain a stable display performance over a long period of time.

8 Claims, 4 Drawing Sheets

DOPED FIELD-EMITTER

BACKGROUND OF THE INVENTION

1. Field of the Invention

The present invention relates to a cathode ray tube (CRT) used in a color television or a high-definition monitor television and further to an electron gun used in an electron beam exposure device or the like that utilizes a converged electron beam. In particular, the present invention relates to a field-emission electron source element used in an electron gun of a highly bright CRT requiring a high current density operation, and an image display apparatus using the same.

2. Description of Related Art

In recent years, with the advent of thin-type displays such as liquid crystal displays or plasma displays, the flat display market has been growing rapidly, though CRT displays still hold an edge in price and performance in application to home televisions about 32 inch diagonal in size. Also, when the digital terrestrial broadcasting is newly introduced, a display technology for television is expected to change drastically. While the television systems are shifting toward a digital system, there is a strong demand for a high-resolution performance of a display, in particular.

However, the television technology that has been used widely so far might not be able to respond to such a demand sufficiently. An electron gun is used in a television as a core portion for displaying an image, and its performance is closely related to the resolution performance. By increasing a current density of a cathode used in the electron gun, it becomes possible to reduce an effective area of the cathode, thereby improving the resolution performance. Although various technological improvements on a hot cathode material that is currently used as the cathode of the electron gun have been made to increase the current density, such improvements have come close to their physical limits and no more dramatic increase in the current density can be expected. A cathode in an electron gun for digital broadcasting, which has been proceeding toward a practical use in recent years, requires about 6 to 10 times as large a current density as a conventional hot cathode. Accordingly, there are increasing expectations for a cold cathode as a technology for achieving a considerable increase in the current density.

On the other hand, an idea of using the cold cathode in the electron gun has been suggested conventionally. The cold cathode has a feature in which a high-density mounting of minute cathodes allows a higher current density. Accordingly, the cold cathode has been commercialized in some products such as electron microscopes.

As the first suggestion of using the cold cathode in a CRT, a color picture tube using a field-mission cathode is disclosed in JP 48(1973)-90467 A. Using the field-emission cathode in the color picture tube is advantageous not only in increasing the current density as described above but also in lowering power consumption. The conventional hot cathode system has required a heater for heating to emit electrons and, thus, consumed electric power of about several watts even in a standby state where the electron gun is not in use. On the other hand, the field-emission cathode, which requires no heater, has the advantages that not only is the electric power not wasted during standby but also the electron gun is activated instantaneously.

In general, a high-melting metal such as molybdenum often is used as a material for the cold cathode. After the completion of CRT manufacturing process, the degree of vacuum inside the CRT usually is about $10^{-4}$ Pa owing to constraints in the manufacturing processes and the structure of the CRT. When the cold cathode is operated at a current density of about 10 A/cm$^2$ under such a vacuum environment, the following problem arises. Inside the CRT, there are various kinds of residual gases that have been generated in the manufacturing process. It is known that oxygen (O) and carbon (C) among the constituent elements of the residual gases temporarily adhere to an emitter surface or change a composition of the emitter surface, thereby lowering an emission performance of the cold cathode.

In response to the above problem, JP 2000-36242 A discloses that the stabilization of an emission current is achieved by utilizing a hydrogen gas ($H_2$). In the following, this will be described with reference to FIG. 8 showing a cross-section of a field-emission light-emitting element using a conventional field-emission electron source element.

A cathode conductor 3 is formed on an upper surface of a cathode substrate 2 of a field-emission light-emitting element 1, and an insulating layer 4 is formed on the cathode conductor 3. On the insulating layer 4, a gate 5 is formed, which contains hydrogen absorbing metals such as Nb, Zr, V, Fe, Ta, Ni and Ti. A plurality of openings 6 are formed in the gate 5 and the insulating layer 4 so as to extend continuously in the thickness direction. On the cathode conductor 3 that is exposed to bottoms of the openings 6 of the insulating layer 4, emitters 7 are formed. Further, an anode conductor 9 is formed on an inner surface of an anode substrate 8, and a phosphor layer 10 is formed on the anode conductor 9.

When the field-emission light-emitting element 1 is turned on, a driving signal is supplied to the anode conductor 9, an intersection of a matrix is selected by the cathode conductor 3 and the gate 5, and the phosphor layer 10 corresponding to a desired position of the anode conductor 9 is made to emit light. The anode conductor current is monitored constantly, and when it falls below a certain level, a signal is supplied to the gate 5 during non-lighting period. In this manner, if an electron hits the gate 5, hydrogen and methane ($CH_4$) are emitted to the vicinity of the emitters 7, thus removing oxygen and carbon adhering to the emitters 7. This prevents an increase in a work function of the emitters 7, thereby restoring the emission performance. As a result, long life and high reliability of the emitters 7 can be achieved.

In this conventional example, by allowing the electron to hit the gate 5 containing the hydrogen absorbing metals, oxygen and carbon adhering temporarily to the emitters 7 are removed, thereby restoring the emission performance. In the case where a high-melting metal such as molybdenum is used as the material for the emitters, since a chemical bond between the high-melting metal on the surface of the emitter 7 and the oxygen and carbon adhering thereto is weak, it is relatively easy to remove the oxygen and carbon by the method according to this conventional example.

However, in the case where other materials, for example, silicon and the like are used as the material for the emitters, there is a problem that the emission performance cannot be restored by using the above-described method of the conventional example. In general, the outermost surface of a clean silicon serving as the emitter is chemically unstable because dangling bonds of the silicon are not terminated. In this case, even a slight amount of oxidizing gases such as $H_2O$ and $CO_2$ present in the vicinity of the emitter causes oxygen in these oxidizing gases to form a bond easily with the dangling bonds in the silicon surface, so that an $SiO_2$ film is formed on the emitter surface. Since the $SiO_2$ film on the emitter surface lowers the electron emission performance of the emitters, the emission current drops considerably. Furthermore, since the $SiO_2$ film is extremely chemically stable, there arises a large problem that once the Si—O bonds are formed in the emitter surface, it is extremely difficult to remove them even by using the gases such as hydrogen and methane in the conventional example, so that the emission performance cannot be restored. Therefore, in the case of using as the emitter a material that is easily oxidized and forms a stable oxide film, such as silicon, it is crucial not to allow the formation of the oxide film that deteriorates the emission performance on the emitter surface.

SUMMARY OF THE INVENTION

The present invention provides a field-emission electron source element including a cathode substrate, an insulating layer that is formed on the cathode substrate and has an opening, a lead electrode formed on the insulating layer, and an emitter formed in the opening. A surface layer of an electron emitting region of the emitter is doped with at least one reducing element selected from the group consisting of hydrogen and carbon monoxide.

Also, the present invention provides an image display apparatus including the above-described field-emission electron source element.

Further, the present invention provides an image display apparatus including a vacuum container, an electron gun disposed inside the vacuum container, a member for deflecting an electron beam emitted from the electron gun, and a phosphor layer provided at a position facing the electron gun. The electron gun includes the above-described field-emission electron source element, and the image display apparatus includes a system for controlling an atmosphere inside the vacuum container to be an atmosphere having a reducing effect on a material for the emitter of the field-emission electron source element.

Additionally, the present invention provides an image display apparatus including a vacuum container, an electron gun disposed inside the vacuum container, a member for deflecting an electron beam emitted from the electron gun, and a phosphor layer provided at a position facing the electron gun. The electron gun includes a field-emission electron source element having an emitter, and the image display apparatus includes a system for controlling an atmosphere inside the vacuum container to be an atmosphere having a reducing effect on a material for the emitter.

DESCRIPTION OF THE PREFERRED EMBODIMENTS

Figure 1:
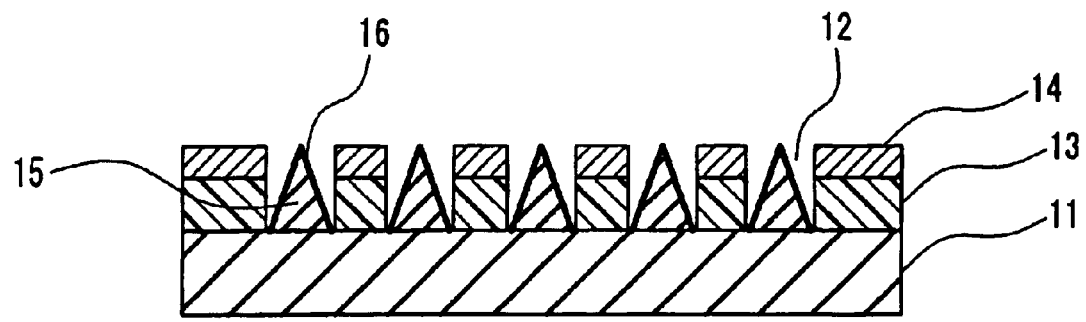
FIG. 1 is a sectional view showing an example of a field-emission electron source element of the present invention.

The present invention provides a stable field-emission electron source element that does not suffer from a current drop even after a high current density operation for a long time and a high-performance image display apparatus that can maintain a stable display performance over a long period of time. In the following, embodiments of the present invention will be described.

An example of the field-emission electron source element of the present invention includes a cathode substrate, an insulating layer that is formed on the cathode substrate and has a plurality of openings, a lead electrode formed on the insulating layer, and a plurality of emitters (cathodes) formed in the plurality of openings on the cathode substrate. A surface layer of an electron emitting region of the emitter is doped with at least one reducing element selected from the group consisting of hydrogen and carbon monoxide.

The hydrogen and carbon monoxide have a reducing effect. Thus, by doping the surface layer of the electron emitting region of the emitter with the above-noted reducing element, the oxidation of the emitter surface can be prevented effectively. Consequently, it is possible to obtain a stable field-emission electron source element that does not cause a current drop even after a high current density operation for a long time.

Here, the emitter is a portion for field-emission of electrons and usually is formed into a cone shape. A tip of this cone-shaped emitter serves as a virtual electron emitting region. Thus, in the field-emission electron source element of the present embodiment, it is necessary to dope the surface layer of at least this electron emitting region with the above-mentioned reducing element. The entire emitter surface may be doped with the reducing element, or a part of the emitter surface including the electron emitting region may be doped with the reducing element.

It is preferable that the emitter is formed of a material containing silicon. This is because silicon can be doped stably with the above-mentioned reducing element. The silicon can be crystalline silicon, amorphous silicon, polysilicon or the like.

Also, the emitter may be formed of metal, and a thin film containing the above-noted silicon may be formed on a surface of the metal. This is because a thin film containing silicon can be doped stably with the above-mentioned reducing element. The above-noted metal can be a high-melting metal such as molybdenum or tungsten.

Further, the surface layer of the emitter to be doped with the reducing element has a thickness of preferably 5 nm to 30 nm, and more preferably 10 nm to 20 nm. Within the above range, doping in a just about the right amount of the reducing element is possible.

Moreover, it is preferable that the doping with the reducing element is carried out by ion doping. The ion doping has been used in a conventional semiconductor manufacturing process and achieves reliable ion doping.

Furthermore, it is more preferable that the doping with the reducing element is carried out by plasma doping. The plasma doping allows doping with the reducing element in a higher concentration compared with the ion doping and thus, makes it possible to prevent further the oxidation of the emitter surface.

An example of an image display apparatus of the present invention includes a vacuum container, an electron gun disposed inside the vacuum container, a member for deflecting an electron beam emitted from the electron gun, and a phosphor layer provided at a position facing the electron gun. The electron gun includes the above-described field-emission electron source element.

Another example of the image display apparatus of the present invention includes a vacuum container, an electron gun disposed inside the vacuum container, a member for deflecting an electron beam emitted from the electron gun, and a phosphor layer provided at a position facing the electron gun. The electron gun includes a field-emission electron source element having an emitter, and the image display apparatus includes a system for controlling an atmosphere inside the vacuum container to be an atmosphere having a reducing effect on a material for the emitter (cathode).

This makes it possible to keep the reducing atmosphere constantly inside the vacuum container, thus preventing the oxidation of the emitter surface effectively so as to maintain a stable electron emission. Consequently, a high-performance image display apparatus that can maintain a stable display performance over a long period of time can be obtained.

Also, for controlling the atmosphere inside the vacuum container to be the atmosphere having the reducing effect, it is preferable to arrange a hydrogen absorbing material inside the vacuum container. This is because the reducing atmosphere can be kept inside the vacuum container in a simple manner and by using a minimum space.

Further, it is preferable to use as the hydrogen absorbing material a material containing at least one of a carbon nanotube, a graphite nanofiber and other carbon materials. These materials have an excellent hydrogen absorbing capability, and this makes it possible to maintain the reducing atmosphere better inside the vacuum container, thus preventing the oxidation of the emitter surface effectively so as to maintain a more stable electron emission.

It also is preferable to use as the hydrogen absorbing material a material containing a hydrogen absorbing metal. This material has an excellent hydrogen absorbing capability, and this makes it possible to maintain the reducing atmosphere better inside the vacuum container, thus preventing the oxidation of the emitter surface effectively so as to maintain a more stable electron emission.

Moreover, it is preferable that the image display apparatus of the present embodiment further includes a heater disposed in the vicinity of the material containing the hydrogen absorbing material. This promotes a hydrogen ($H_2$) emission from the hydrogen absorbing material, and this makes it possible to maintain the reducing atmosphere better inside the vacuum container, thus preventing the oxidation of the emitter surface effectively so as to maintain a more stable electron emission.

Furthermore, it is preferable that the above-mentioned electron gun includes the above-described field-emission electron source element of the present embodiment. By doping the surface layer of the electron emitting region of the emitter with at least one reducing element selected from the group consisting of hydrogen and carbon monoxide and keeping the reducing atmosphere inside the vacuum container, it is possible to prevent the oxidation of the emitter surface reliably so as to maintain a more stable electron emission. Consequently, a high-performance image display apparatus that can maintain a stable display performance over a longer period of time can be obtained.

The following is a more specific description of embodiments of the present invention, with reference to the accompanying drawings.

First Embodiment

FIG. 1 is a sectional view showing an example of a field-emission electron source element of the present invention. As shown in FIG. 1, an insulating layer 13 having a circular opening 12 in each of arrayed cathode forming regions is formed on a cathode substrate 11. On the insulating layer 13, a lead electrode 14 is formed for controlling electron emission.

In view of a characteristic of the electron source element and a processing condition thereof, a suitable material such as a usual glass substrate or a silicon substrate can be used as the material for the cathode substrate 11. The material for the insulating layer 13 can be a silicon oxide ($SiO_2$) film or a silicon nitride film used in semiconductor manufacturing processes or a combined film thereof. The material for the lead electrode 14 can be a wiring material using a low-resistivity high-melting metal such as a polysilicon film or a tungsten film.

Furthermore, inside the opening 12 of the insulating layer 13 and the lead electrode 14, an emitter (cathode) 15 serving as an electron emitting portion is formed. A plurality of the emitters 15 form a field-emission electron source array portion, which may be formed over an entire surface of the cathode substrate 11 or a desired partial surface thereof The shape of the emitter 15 is not particularly limited but usually is a cone shape having a sharp tip.

The material for the emitter 15 can be a semiconductor of crystalline silicon, amorphous silicon, polysilicon or the like. In this case, the emitter 15 can be manufactured by a semiconductor manufacturing process such as vapor deposition, sputtering or CVD. In the case where a high-melting metal such as molybdenum or tungsten is used as the material for the emitter 15, a silicon thin film is formed on the surface of the high-melting metal for easier doping with a reducing element. In this case, the emitter 15 can be manufactured by vapor-depositing an emitter body formed of the high-melting metal and then carrying out the above-noted semiconductor manufacturing process to form the silicon thin film on the surface of the high-melting metal.

Moreover, a surface layer 16 of the emitter 15 is doped with at least one reducing element selected from the group consisting of hydrogen and carbon monoxide. Here, since the tip of the cone-shaped emitter 15 serves as a virtual electron emitting region, at least a surface layer of this electron emitting region needs to be doped with the above-mentioned reducing element. The entire surface layer of the emitter may be doped with the reducing element, or a partial surface layer of the emitter including the electron emitting region may be doped therewith.

Now, the field-emission electron source element of the present embodiment will be described, with an exemplary case of using silicon as the material for the emitter 15.

As mentioned earlier, a silicon material has a tendency of reacting easily with an oxidizing gas in an oxidizing gas atmosphere so as to form a $SiO_2$ film as an oxide film. Upon exposing a clean silicon surface to the air at ordinary temperature, a $SiO_2$ film of several atomic layers is formed on the surface within a few minutes. The degree of vacuum inside a CRT usually is about $10^{-4}$ Pa owing to constraints in the manufacturing processes and a structure of the CRT. A large amount of oxidizing gases such as $H_2O$ and $CO_2$ also is contained in the residual gas inside the CRT. When the cold cathode is operated at a current density of about 10 $A/cm^2$ under such a vacuum environment, the silicon surface (emitter surface) of the field-emission electron source element serving as an operation region of the cold cathode is activated by an ion generated by a collision with emitted electrons and the residual gas. Recent studies conducted by the inventors have revealed that, even in the vacuum environment, the activated silicon surface and the ionized oxidizing gas easily form a chemical bond, so that the $SiO_2$ film as the oxide film covers the outermost silicon surface. This poses the greatest technological challenge in utilizing the silicon materials as the CRT cathode.

On the other hand, it is known that hydrogen and carbon monoxide, for example, have a reducing effect on the silicon materials. Accordingly, it is expected that the oxidation of the silicon surface by the oxidizing gas described above can be suppressed by doping the surface layer of silicon with a reducing element such as hydrogen or carbon monoxide. A doping layer having an antioxidation function can be formed on the silicon surface by a plurality of methods including ion doping and plasma doping.

In the present embodiment, the dimension of each portion in the field-emission electron source element and the method for manufacturing these portions are not limited specifically but can be selected suitably.

The present embodiment has been described referring to the example in which the field-emission electron source element is applied to a representative cathode ray tube (CRT). However, the application is not limited to the cathode ray tube, but the field-emission electron source element also is applicable to high-intensity light-emitting display tubes for outdoor use or light-emitting display tubes for illumination, for example.

Next, an example in which the field-emission electron source element is manufactured by the ion doping for manufacturing a TFT (Thin Film Transistor) device used in a liquid crystal display will be described, with reference to the accompanying drawing.

Figure 2:
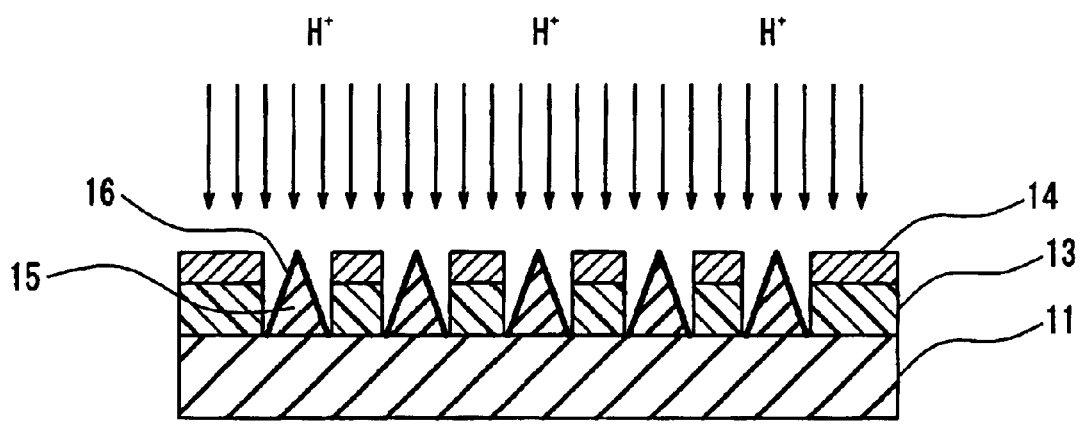
FIG. 2 is a sectional view showing an example of a process of manufacturing the field-emission electron source element of the present invention.

FIG. 2 is a sectional view showing an example of a process of manufacturing the field-emission electron source element of the present invention. As shown in FIG. 2, after completing the field-emission electron source element, an ion doping process using a hydrogen ion as an ion source is performed over an entire surface of the field-emission electron source element. The processing condition appropriately is an acceleration energy of about 20 to 30 keV and a doping amount of about $5 \times 10^{15}$ $atom/cm^2$.

With this ion doping process, the surface layer 16 doped with the hydrogen ion in a high concentration is formed on the entire surface of the emitter 15 formed of silicon or at least a partial surface thereof including the electron emitting region. Further, for activating the doped hydrogen ion, an annealing process is carried out in a nitrogen atmosphere or a vacuum atmosphere at 800° C. for about 30 minutes. With this annealing process, the hydrogen ion on the silicon surface is incorporated into a silicon crystal, thus presenting the antioxidation function effectively.

In order to verify the effect of this doped hydrogen ion, the current stability was examined while operating the field-emission electron source element continuously in a vacuum chamber in which a slight amount of an oxidizing gas such as $H_2O$ was present.

The composition and partial pressure of the residual gas in the vacuum chamber were examined using a quadrupole mass spectroscope (Q-Mass). The dominant gas in the residual gas at a degree of vacuum of $1 \times 10^{-6}$ Pa was $H_2O$, which accounted for about 70 vol % of the residual gas. It was found that the residual gas contained $N_2$ (15 vol %), $H_2$ (9 vol %), $CO_2$ (6 vol %), etc besides $H_2O$. The field-emission electron source element with an emitter formed of silicon by sputtering was introduced in this vacuum chamber, so as to measure variation in the field-emission current.

The schematic structure of the field-emission electron source element described above was as follows. Polysilicon subjected to an electrically conducting treatment used generally in the semiconductor manufacturing process was used as a lead electrode, and its opening had a diameter of about 0.6 $\mu$m. Also, a radius of curvature of the emitter tip, which influences field-emission characteristics, was formed to be about several nm by utilizing a sharpening effect of thermal oxidation of silicon. The number of the emitters was 1000, and the distance between them was 1.6 $\mu$m. Further, this time, an emission condition of 100 $\mu$A was selected as a condition of emission current, which influences the current stability along with the residual gas.

Next, the surface layer of the emitter of the field-emission electron source element produced with the above-described structure and condition was doped with the hydrogen ion by ion doping. The acceleration voltage of the doping was 20 keV, and the doping amount was $5 \times 10^{15}$ $atom/cm^2$. The field-emission electron source element produced as above served as an element of Example. In contrast, the field-emission electron source element produced similarly to the above-noted element of Example except that no doping of the hydrogen ion was carried out served as an element of the Comparative Example.

Figure 3:
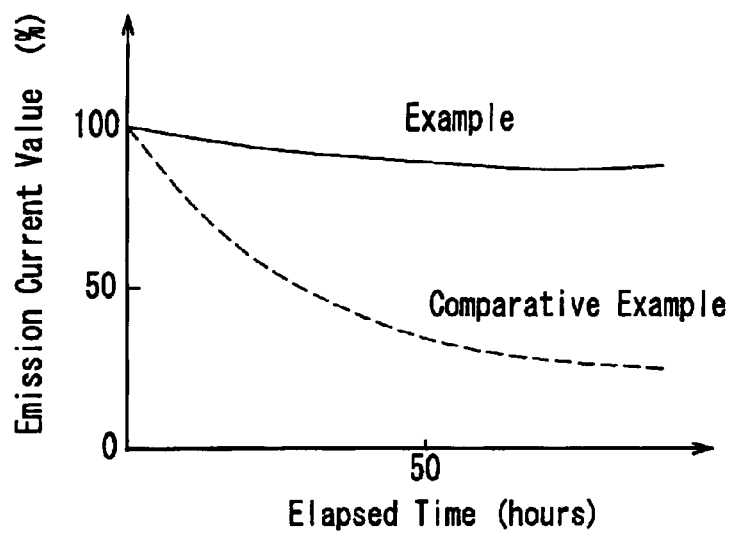
FIG. 3 is a graph showing the relationship between elapsed time and an emission current value of a field-emission electron source element of Example and that of Comparative Example.

FIG. 3 shows the relationship between elapsed time and an emission current value of the field-emission electron source element of Example and that of Comparative Example. In FIG. 3, the emission current value (%) is indicated as a value relative to an initial emission current value (at time 0) of 100 (%). As becomes clear from FIG. 3, there was a notable difference in the current stability between the field-emission electron source element doped with the hydrogen ion (Example) and that doped with no hydrogen ion (Comparative Example). In other words, the emission current value of the element of Comparative Example dropped by half at the elapsed time of about 30 hours, whereas the emission current value of the element of Example still was 90% or more of the initial value even after 30 hours.

Thereafter, the surfaces of both of the field-emission electron source elements were analyzed by Auger electron spectroscopy. Then, it was found that the surface of the electron emitting region in the element of the Comparative Example was covered with an $SiO_2$ film, and that this surface oxidation was a major factor in the current drop. On the other hand, in the element of Example, no notable $SiO_2$ film was found on the surface of its electron emitting region. These analyses proved that the surface layer of the emitter doped with the hydrogen ion suppressed the oxidation effect of the oxidizing gas and worked effectively in a stable emission operation over a long period of time.

Additionally, the surface layer of the silicon material can be doped with hydrogen in a still higher concentration by plasma doping instead of the above-described ion doping. In this plasma doping method, plasma of a gas containing hydrogen is generated, and the silicon material is placed directly in this plasma, thereby doping the entire surface of the silicon material at an extremely low energy (an energy of not greater than several keV). This allows a formation of a high-concentration hydrogen doping layer in a region 10 to 30 nm deep from the surface of the silicon material. With this method, it becomes possible to dope the surface layer of the silicon material with hydrogen in a still higher concentration compared with the ion doping described above, thus enhancing further the antioxidation effect of the emitter.

As described above, with the field-emission electron source element according to the present embodiment, the hydrogen doping layer is formed on the surface layer of the electron emitting region of the emitter of the field-emission electron source element, making it possible to prevent the oxidation of the emitter (cathode) surface effectively, so that a stable electron emission performance can be maintained.

Second Embodiment

Figure 4:
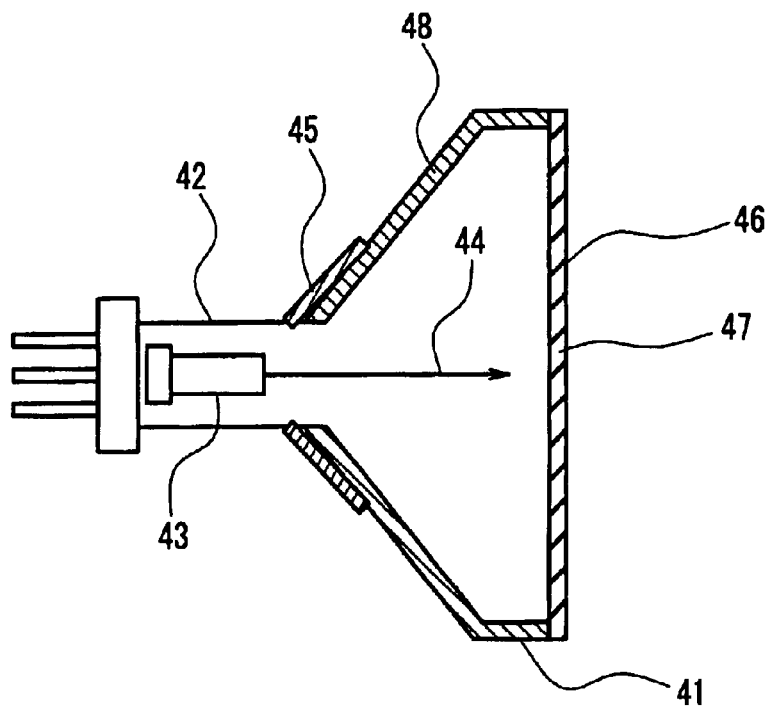
FIG. 4 is a sectional view showing an example of an image display apparatus of the present invention.

FIG. 4 is a sectional view showing an example of an image display apparatus of the present invention. As shown in FIG. 4, the image display apparatus of the present embodiment includes a bulb 41 and an electron gun 43 provided in a neck 42 of the bulb 41. An electron beam 44 emitted from the electron gun 43 is scanned by a deflection yoke 45 mounted on an outer periphery of a funnel and irradiated on a phosphor layer 47 attached to an inner surface of a face panel 46, thus forming an image over an entire surface of the face panel 46. Furthermore, an inner surface of the funnel is provided with an electrically conductive material 48 formed of a hydrogen absorbing material and an electrical conductor such as graphite. Conventionally, this electrically conductive material usually has been an electrically conductive paste containing an electrical conductor such as graphite as a main component in order to maintain a constant electric potential in the face panel 46 and the neck 42 that are supplied with a voltage as high as about 30 kV. On the other hand, in the present embodiment, the electrically conductive material is a mixture of this electrically conductive paste and a hydrogen absorbing material. Although there is no particular limitation on where to arrange this hydrogen absorbing material as long as it is inside a vacuum container, it is easy in the manufacturing process to include it in the electrically conductive material 48 usually used in a CRT.

The following is a specific description of the function of the electrically conductive material 48 containing the hydrogen absorbing material, which is a characteristic of the present embodiment.

Recent studies have revealed that carbon nanotube (CNT) materials serve as a promising material having a hydrogen absorbing function, and this has attracted much attention. A mechanism has been elucidated in which a hydrogen gas can be stored in an inner pore of a straw-shaped CNT by subjecting the CNT to a certain treatment in a high-pressure hydrogen atmosphere. Depending on the condition of the hydrogen treatment, it is reported that the absorbing amount sometimes reaches as much as 10 wt %. This CNT material subjected to the hydrogen absorbing treatment is utilized as the electrically conductive paste used as the electrically conductive material inside the CRT or utilized as a mixture of this electrically conductive material, thereby allowing a certain amount of hydrogen to be absorbed inside the CRT. At this time, by considering a vacuum environment such as that resulting from the processing condition of the CRT manufacture and the condition of inner tube getter, the amount of CNT and the hydrogen absorbing condition thereof can be set so as to discharge a certain amount of hydrogen constantly. The partial pressure of hydrogen serving as the reducing gas discharged from the CNT constantly is set about 3 to 10 times as high as the partial pressure of the oxidizing gas ($H_2O$, $O_2$, $CO_2$ etc.) inside the CRT, making it possible to maintain the inside of the CRT to have the reducing gas atmosphere constantly.

The first embodiment described above has been directed to the configuration of preventing the oxidation of the emitter surface effectively by doping the surface layer of the electron emitting region of the emitter of the field-emission electron source element with hydrogen or carbon monoxide. Also in the image display apparatus of the present embodiment, it was confirmed that substantially the same antioxidation effect as the first embodiment could be obtained. Further, also in the current stability evaluation while operating the image display apparatus continuously as in the first embodiment, it was confirmed that a stable electron emission from the emitter of the field-emission electron source element could be obtained over a long period of time by using the CNT of the present embodiment so that the atmosphere inside the CRT is the reducing gas atmosphere.

Moreover, although the present embodiment has illustrated an example of using the CNT having an excellent hydrogen absorbing effect, not only the CNT but also other carbon materials such as graphite nanofibers, activated carbon and fullerene can be used because they have been confirmed to have a similar hydrogen absorbing effect.

In the present embodiment, the dimension of each portion in the image display apparatus and the method for manufacturing these portions are not limited specifically but can be selected suitably.

The present embodiment has been described referring to the example in which the image display apparatus is applied to a representative cathode ray tube (CRT). However, the application is not limited to the cathode ray tube, but the image display apparatus also is applicable to high-intensity light-emitting display tubes for outdoor use or light-emitting display tubes for illumination, for example.

As described above, with the image display apparatus according to the present embodiment, the atmosphere inside the vacuum container of the CRT is controlled to be an atmosphere having a reducing effect on the emitter material of the electron gun, making it possible to prevent the oxidation of the emitter (cathode) surface effectively, so that a stable electron emission performance can be maintained and a long-life operation and a stable operation can be achieved in a highly effective manner.

In addition, the use of the field-emission electron source element described in the first embodiment as the field-emission electron source element of the electron gun used in the present embodiment further enhances the effect described in the present embodiment, so that a more desirable effect can be expected.

Third Embodiment

Figure 5:
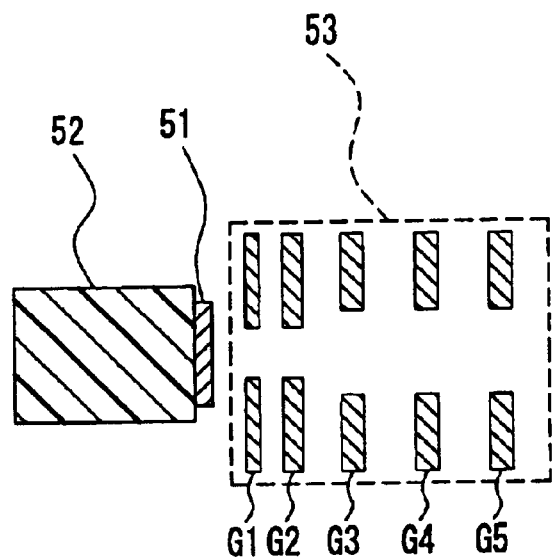
FIG. 5 is a sectional view schematically showing an example of an electron gun used in the image display apparatus of the present invention.

FIG. 5 is a sectional view schematically showing an example of an electron gun used in the image display apparatus of the present invention. In FIG. 5, a field-emission electron source element 51 is fixed onto a cathode structure 52. At a position facing the field-emission electron source element 51, an electron lens portion 53 constituted by a group of grid electrodes G1 to G5 is disposed. Each of the grid electrodes G1 to G5 constituting this electron lens portion 53 is supplied with an optimal voltage and has a function of accelerating/focusing an electron beam emitted from the field-emission electron source element 51.

In the present embodiment, as a system for controlling the atmosphere inside the vacuum container of the CRT to be an atmosphere having a reducing effect on the emitter material of the electron gun, the following structure is added to the electron gun. That is, among the constituent members of the electron gun, at least one of the cathode structure 52 and the grid electrodes G1 to G5 constituting the electron lens portion 53 is produced using a hydrogen absorbing metal having a hydrogen absorbing function. The hydrogen absorbing metal can be, for example, Ti, Mg, Pd or an alloy such as TiCo. Such a metal is subjected to a hydrogen annealing treatment of exposing it to a hydrogen atmosphere at a temperature as high as about 300° C. to 1000° C. for a certain period, thereby obtaining a metal in which a certain amount of hydrogen is absorbed. Since these members also are exposed to various heat treatment conditions in the CRT manufacturing process, the material and processing condition with which the performance can be maintained under the high-temperature environment are set suitably. More specifically, the partial pressure of hydrogen serving as the reducing gas discharged from the hydrogen absorbing metal constantly is set about 3 to 10 times as high as the partial pressure of the oxidizing gas ($H_2O$, $O_2$, $CO_2$ etc.) inside the CRT, making it possible to maintain the inside of the CRT to have the reducing gas atmosphere constantly. Moreover, since at least one of the cathode structure 52 and the grid electrodes G1 to G5 constituting the electron lens portion 53 among the constituent members of the electron gun is produced using a hydrogen absorbing metal having a hydrogen absorbing function as described in the present embodiment, the discharged hydrogen constantly is present in the vicinity of the emitter (cathode). Accordingly, the antioxidation effect of the emitter further is enhanced, and thus, a more stable cathode operation can be expected.

The first embodiment described above has been directed to the configuration of preventing the oxidation of the emitter surface effectively by doping the surface layer of the electron emitting region of the emitter of the field-emission electron source element with hydrogen. Also in the image display apparatus of the present embodiment, it was confirmed that the antioxidation effect substantially equivalent to that in the first embodiment could be obtained. Further, also in the current stability evaluation while operating the image display apparatus continuously as in the first embodiment, it was confirmed that a stable electron emission from the emitter of the field-emission electron source element could be obtained over a long period of time by using the hydrogen absorbing metal of the present embodiment so that the atmosphere inside the CRT is the reducing gas atmosphere.

Figure 6:
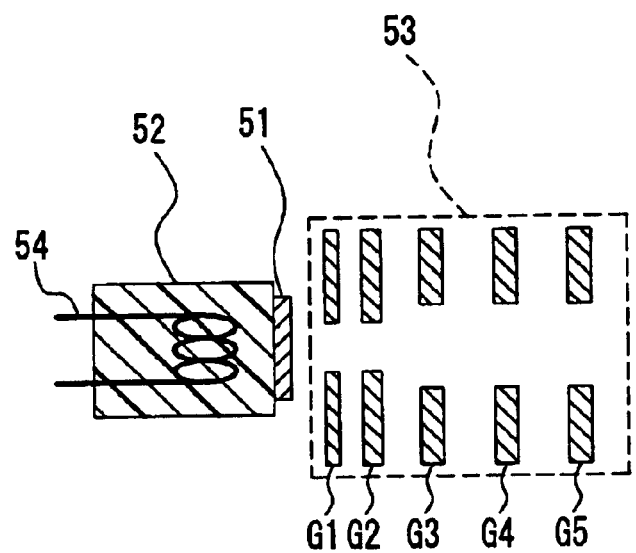
FIG. 6 is a sectional view schematically showing another example of the electron gun used in the image display apparatus of the present invention.
Figure 7:
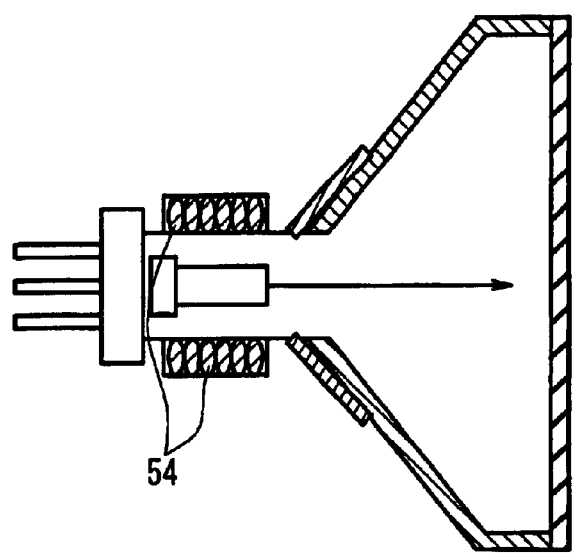
FIG. 7 is a sectional view showing another example of the image display apparatus of the present invention.
Figure 8:
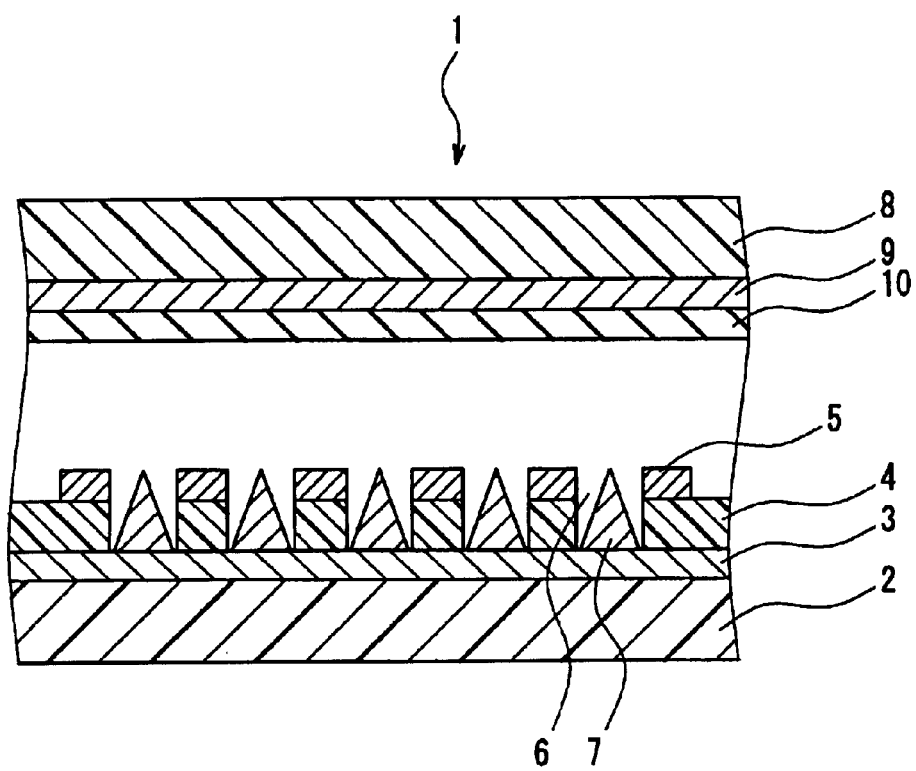
FIG. 8 is a sectional view showing a field-emission light-emitting element using a conventional field-emission electron source element.

Moreover, as shown in FIG. 6, it also is effective to provide a part of the cathode structure 52 with a heater 54 as a mechanism of heating the vicinity of the cathode to a certain temperature. Furthermore, as shown in FIG. 7, after producing the CRT, a heater 54 for heating the cathode from outside can be provided so as to perform a similar heat treatment. With these heating mechanisms, it becomes possible to discharge hydrogen that is absorbed in the hydrogen absorbing metal toward the vicinity of the cathode effectively, thereby maintaining the reducing atmosphere in the vicinity of the cathode effectively. Further, the heat treatment not only enhances the hydrogen discharge from the hydrogen absorbing metal but also heightens the surface cleaning effect of the field-emission electron source element itself In addition, the effect of restoring the emission performance also can be expected by the heat treatment to remove absorbed gas components such as oxygen and carbon that have adhered temporarily to the emitter surface owing to the operation inside the CRT.

The present embodiment has illustrated the example of using the hydrogen absorbing metal directly as the material for the cathode structure constituting the electron gun. However, the surface of a commonly-used member of the electron gun also can be coated with the hydrogen absorbing material and used so as to achieve the similar effect.

In the present embodiment, the dimension of each portion in the image display apparatus and the electron gun and the method for manufacturing these portions are not limited specifically but can be selected suitably.

The present embodiment has been described referring to the example in which the image display apparatus is applied to a representative cathode ray tube (CRT). However, the application is not limited to the cathode ray tube, but the image display apparatus also is applicable to high-intensity light-emitting display tubes for outdoor use or light-emitting display tubes for illumination, for example.

As described above, with the image display apparatus according to the present embodiment, the atmosphere inside the vacuum container of the CRT is controlled to be an atmosphere having a reducing effect on the emitter material of the electron gun, making it possible to prevent the oxidation of the emitter (cathode) surface effectively, so that a stable electron emission performance can be maintained and a long-life operation and a stable operation can be achieved in a highly effective manner.

In addition, the use of the field-emission electron source element described in the first embodiment as the field-emission electron source element of the electron gun used in the present embodiment further enhances the effect described in the present embodiment, so that a more desirable effect can be expected.

As described above, in the field-emission electron source element of the present invention, by doping the surface layer of the electron emitting region of the emitter with at least one reducing element selected from the group consisting of hydrogen and carbon monoxide, it is possible to prevent the oxidation of the emitter (cathode) surface effectively. Therefore, a stable electron emitting performance can be maintained.

Furthermore, since the image display apparatus of the present invention includes a system for controlling the atmosphere inside the vacuum container to be an atmosphere having a reducing effect on the emitter material of the electron gun, it is possible to prevent the performance deterioration owing to the oxidation of the field-emission electron source element used as the cathode of the electron gun. Consequently, a long-life operation and a stable operation can be achieved in a highly effective manner.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A field-emission electron source element comprising:
   a cathode substrate;
   an insulating layer that is formed on the cathode substrate and has an opening;
   a lead electrode formed on the insulating layer; and
   an emitter formed in the opening;
   wherein a surface layer of an electron emitting region of the emitter is doped with at least one reducing element selected from the group consisting of hydrogen and carbon monoxide.

2. The field-emission electron source element according to claim 1, wherein the emitter is formed of a material containing silicon.

3. The field-emission electron source element according to claim 1, wherein the emitter is formed of metal, and a thin film containing silicon is formed on a surface of the metal.

4. The field-emission electron source element according to claim 1, wherein the surface layer has a thickness of 5 nm to 30 nm.

5. The field-emission electron source element according to claim 1, wherein the doping with the reducing element is carried out by ion doping.

6. The field-emission electron source element according to claim 1, wherein the doping with the reducing element is carried out by plasma doping.

7. An image display apparatus comprising the field-emission electron source element according to claim 1.

8. An image display apparatus comprising:

a vacuum container;

an electron gun disposed inside the vacuum container;

a member for deflecting an electron beam emitted from the electron gun; and a phosphor layer provided at a position facing the electron gun;

wherein the electron gun comprises the field-emission electron source element according to claim 1, and the image display apparatus comprises a system for controlling an atmosphere inside the vacuum container to be an atmosphere having a reducing effect on a material for the emitter of the field-emission electron source element.

* * * * *